(12) United States Patent
Michael et al.

(10) Patent No.: US 10,885,384 B2
(45) Date of Patent: Jan. 5, 2021

(54) LOCAL TONE MAPPING TO REDUCE BIT DEPTH OF INPUT IMAGES TO HIGH-LEVEL COMPUTER VISION TASKS

(71) Applicant: Intel Corporation, Santa Clara, CA (US)

(72) Inventors: Gilad Michael, Sunnyvale, CA (US); Sushma Rao, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 16/232,715

(22) Filed: Dec. 26, 2018

(65) Prior Publication Data

US 2019/0130208 A1 May 2, 2019

Related U.S. Application Data

(60) Provisional application No. 62/767,776, filed on Nov. 15, 2018.

(51) Int. Cl.
| | |
|---|---|
| G06K 9/62 | (2006.01) |
| G06K 9/00 | (2006.01) |
| G06K 9/46 | (2006.01) |
| G06K 9/54 | (2006.01) |
| G06T 5/20 | (2006.01) |

(52) U.S. Cl.
CPC ....... G06K 9/6256 (2013.01); G06K 9/00624 (2013.01); G06K 9/4628 (2013.01); G06K 9/54 (2013.01); G06K 9/6274 (2013.01); G06T 5/20 (2013.01); G06T 2207/20048 (2013.01); G06T 2207/20081 (2013.01); G06T 2207/20084 (2013.01); G06T 2207/20224 (2013.01)

(58) Field of Classification Search
CPC ............. G06K 9/6256; G06K 9/00624; G06K 9/4628; G06K 9/54; G06K 9/6274; G06T 5/20; G06T 2207/20048; G06T 2207/20081; G06T 2207/20084; G06T 2207/20224
USPC ......................................................... 382/157
See application file for complete search history.

(56) References Cited

U.S. PATENT DOCUMENTS

| | | | |
|---|---|---|---|
| 9,836,484 B1* | 12/2017 | Bialynicka-Birula | ....................... G06F 16/51 |
| 2006/0072799 A1* | 4/2006 | McLain | ................... G06T 5/40 382/128 |
| 2009/0290779 A1* | 11/2009 | Knapp | ...................... G06T 7/11 382/132 |
| 2017/0142397 A1* | 5/2017 | Peterson | ................... G06T 7/97 |
| 2018/0196587 A1* | 7/2018 | Bialynicka-Birula | ....................... G06K 9/00677 |
| 2018/0367752 A1* | 12/2018 | Donsbach | .......... G06K 9/00221 |

(Continued)

OTHER PUBLICATIONS

Geiger, et al., "Are we ready for Autonomous Driving? The KITTI Vision Benchmark Suite", CVPR 2012, 8 pages.

(Continued)

*Primary Examiner* — Ali Bayat
(74) *Attorney, Agent, or Firm* — Green, Howard & Mughal LLP.

(57) ABSTRACT

Techniques related to computer vision tasks are discussed. Such techniques include applying a pretrained non-linear transform and pretrained details boosting factor to generate an enhanced image from an input image and reducing the bit depth of the enhanced image prior to applying a pretrained computer vision network to perform the computer vision task.

22 Claims, 7 Drawing Sheets

(56) References Cited

U.S. PATENT DOCUMENTS

2020/0074295 A1* 3/2020 O'Donncha ............ G06F 17/13
2020/0104721 A1* 4/2020 Mori ...................... G06N 3/084

OTHER PUBLICATIONS

Wu, et al., "SqueezeDet: Unified, Small, Low Power Fully Convolutional Neural Networks for Real-Time Object Detection for Autonomous Drive", CVPRW 2017, pp. 129-137.

Chen, et al., "Fast Image Processing with Fully-Convolutional Networks", arXiv:1709.00643v1; ICCV 2017, Sep. 2, 2017.

Diamond, et al., "Dirty Pixels: Optimizing Image Classification for Raw Sensor Data", arXiv:1701.06487v1, Jan. 23, 2017.

Howard, et al., "MobileNets: Efficient Convolutional Neural Networks for Mobile Vision Applications", https://arxiv.org/abs/1704.04861, Apr. 17, 2017.

Mody, et al., "Efficient Pre-Processor for CNN", IS&T International Symposium on Electronic Imaging, Autonomous Vehicles and Machines, 2017.

* cited by examiner

LOCAL TONE MAPPING TO REDUCE BIT DEPTH OF INPUT IMAGES TO HIGH-LEVEL COMPUTER VISION TASKS

CROSS REFERENCE TO RELATED APPLICATIONS

This non-provisional patent application is related to, and claims priority to, the U.S. provisional application entitled "TRAINABLE VISION SCALER AND VISION LOCAL TONE MAPPER", filed Nov. 15, 2018, having an application Ser. No. 62/767,776 the entire contents of which are incorporated herein by reference.

BACKGROUND

High-level computer vision (CV) applications have gained prominence due to the use of deep artificial neural networks for artificial intelligence (AI). Such applications include models to perform object detection, classification, semantic segmentation, facial landmarks detection, feature detection for software-defined cockpits, etc. The models of the high-level CV applications typically take as input raw data directly from an image sensor or processed data from an image signal processor (ISP).

In some contexts, such as mobile device implementations, it is challenging to transmit high-resolution outputs from a sensor or ISP for use in a high-level CV engine given low power and low latency requirements. In many applications, such constraints necessitate a trade-off between frame-rate and resolution. It is undesirable to reduce frame rates, as an object may be missed or important details may be ignored. Reducing resolution again may cause missed objects or details in the high-level CV application.

It may be advantageous to perform high-level CV in low power and low latency environments without loss of frame rate and with little or no loss in resultant quality. It is with respect to these and other considerations that the present improvements have been needed. Such improvements may become critical as the desire to perform CV in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
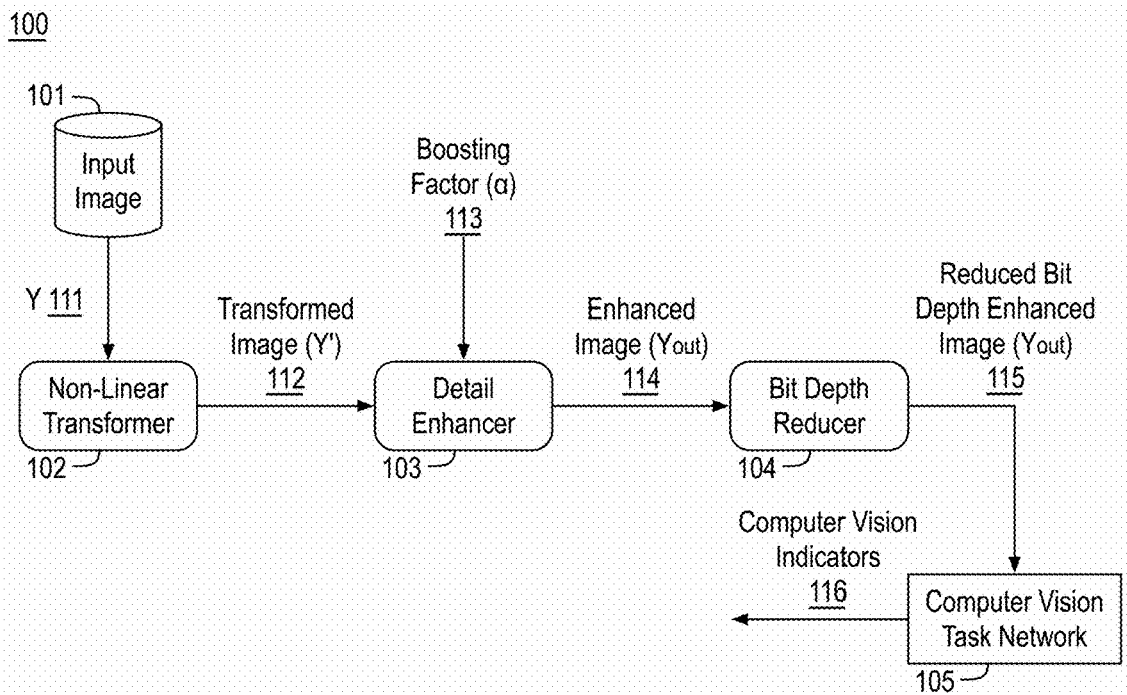
FIG. 1 illustrates an example device for performing computer vision tasks using local tone mapping to reduce bit depth of an input image.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein. The terms "substantially," "close," "approximately," "near," and "about," generally refer to being within +/−10% of a target value. The term "satisfies" when used in reference to a threshold indicates the value in question meets the condition established by the threshold. The terms "compares favorably" when used in reference to a threshold indicates the value in question is greater than or greater than or equal to the threshold. Similarly, the terms "compares unfavorably" when used in reference to a threshold indicates the value in question is less than or less than or equal to the threshold.

Methods, devices, apparatuses, computing platforms, and articles are described herein related to local tone mapping to reduce the bit depth of inputs to high level computer vision tasks.

As described above, it may be advantageous to perform high-level CV in low power and low latency environments without loss of frame rate and with little or no loss in resultant quality. As used herein, the term high-level CV indicates use of a pretrained deep artificial neural network that is applied to an in input image to generate output computer vision indicators. Such deep artificial neural networks include multiple layers between the input and output layer and attempt to correctly map the input to a desired output through pretraining using a training corpus with ground truth information. Deep artificial neural networks include fully connected neural networks, convolutional neural networks, and combinations of such neural network layers. The deep artificial neural networks may be pretrained to perform any computer vision task. As used herein, the term computer vision indicates use by a computational device of a digital image or digital video to gain some form of high-level understanding from the digital image or digital video such as the class of a detected object (e.g., person, building, automobile, etc.), semantic segmentation regions (e.g., regions of an image that are labeled with a classification (e.g., person, building, automobile, etc.), facial landmarks (e.g., positions of parts of eyes, a mouth, etc.), software defined cockpit landmarks, etc.

In some embodiments, prior to implementation of such a pretrained deep artificial neural network, a digital image is preprocessed to both enhance details of the digital image and to reduce the bit depth of the digital image. The detail enhancement and bit depth reduction are performed by applying a pretrained non-linear transform to an input image to generate a transformed image, enhancing details of the transformed image based in part on applying a pretrained details boosting factor to image details of the transformed image to generate an enhanced image, and reducing a bit depth of the enhanced image from a first bit depth to a second bit depth. Notably, the input image, the transformed image, image details of the transformed image, and the reduced bit depth enhanced image all have the same spatial image resolution. As used herein, the term spatial image resolution indicates the number of pixels and/or dimensionality of pixels of the image (e.g., H×W pixels where the image has a height in pixels of H and a width in pixels of W).

In some embodiments, enhancing details of the transformed image to generate the enhanced image includes applying a low-pass filter to the transformed image to generate a low pass filtered image, differencing the low pass filtered image from the transformed image to provide the details of the transformed image, multiplying the details of the transformed image by the pretrained details boosting factor to generate enhanced details of the transformed image, and summing the low pass filtered image and the enhanced details of the transformed image to generate the enhanced image. After such detail enhancement, the bit depth of the enhanced image is reduced as discussed by, for example, a pixel-wise bit shift operation. The bit depth reduction may be any suitable bit depth reduction such as from a per-pixel bit depth of 8 bits to a per-pixel bit depth of 4 or 2 bits. In an embodiment, such processing is performed using only a luma channel of the discussed images.

As discussed, the computer vision network, the non-linear transform, and the details boosting factor are pretrained. Notably, the computer vision network, the non-linear transform, and the details boosting factor are pretrained in conjunction with one another using a single training corpus. As used herein, the term pretrained in conjunction with one another indicates the pretraining is performed in the same instance using the same training corpus. In an embodiment, the pretraining is performed in an end-to-end manner using, in series, the non-linear transform, the details boosting factor (in the context of detail enhancement), and the computer vision network such that a loss function is minimized for the resultant computer vision task using a training corpus with ground truth computer vision task result information. Thereby, the non-linear transform, the details boosting factor, and the computer vision network are tuned together for the computer vision task.

In another embodiment, the computer vision network is first pretrained using a first training corpus and, subsequently, a second training corpus is used to train the non-linear transform and the details boosting factor by applying the second training corpus in an end-to-end manner to the non-linear transform, the details boosting factor, and the computer vision network without change to the computer vision network. Thereby, a non-linear transform and details boosting factor may be tuned to an already trained computer vision network.

In yet another embodiment, the pretraining is performed using multiple computer vision networks, which are already pretrained or being trained simultaneously. For example, the loss function from each of the multiple computer vision networks may be summed and the training may minimize the shared loss of the multiple computer vision networks. Thereby, a single non-linear transform and a single details boosting factor are pretrained such that they may be applied to preprocess an image for use by multiple computer vision networks either simultaneously or as selected by a user or application.

The techniques discussed herein provide visual local tone mapping to preserve details that are critical to performing a given computer vision task while reducing the number of bits of the input image to the given computer vision task. Such bit depth reduction reduces latency, reduces power, increases speed, and provides an overall improvement to the image processing device while only slightly reducing computer vision task performance and, in some contexts, even improving the computer vision task performance.

Notably, for many computer vision tasks (e.g. classification, object detection, etc.), features of the input image such as edges and corners are important in making accurate predictions using the pretrained computer vision network. Simplistically reducing bit depth by some factor would result in loss of those details and dramatically reduce the performance of the computer vision network. The discussed techniques of applying a non-linear to the input image and enhancing details using a pretrained details boosting factor prior to bit depth reduction maintain or even enhance such important details. Furthermore, the resultant bit depth reduction is valuable as it directly translates to simpler hardware (e.g., reduced dedicated integrated circuit area), reduced bandwidth, and significant power savings in implementation. Such advantages are continual goals in device implementation, particularly in mobile devices. The local tone mapping for computer vision task discussed herein provides a reduction in bit depth with a minimal (if any) impact to the accuracy of the computer vision application thereby achieving the same or similar computer vision accuracy with fewer bits per pixel in the input image.

FIG. 1 illustrates an example device 100 for performing computer vision tasks using local tone mapping to reduce bit depth of an input image, arranged in accordance with at least some implementations of the present disclosure. As shown in FIG. 1, device 100 includes a memory store 101 storing one or more input images 111, a non-linear transformer 102, a detail enhancer 103, a bit depth reducer 104, and a computer vision task network 105. Device 100 may be implemented in any suitable form factor device such as a personal computer, a laptop computer, a tablet, a phablet, a smart phone, a digital camera, a gaming console, a wearable device, a display device, an all-in-one device, a two-in-one device, a motor vehicle platform, a robotics platform, etc. For example, device 100 may perform computer vision tasks including any one or more of object detection, object classification, semantic segmentation, facial landmarks detection, feature detection for software-defined cockpits, etc. as discussed herein.

As shown, memory store 101 attains one or more input images 111. Memory store 101 may attain input images 111 from an imaging device, another device via a communications channel (not shown), an image signal processor (not shown), etc. Input images 111 may include any suitable picture, frame, or the like or any data structure (e.g., image data) representing a picture or frame at any suitable spatial image resolution. Notably, the discussed processing maintains the spatial image resolution through introduction of the processed image (e.g., a reduced bit depth enhanced image 115) to computer vision task network 105, while the bit depth is reduced. In an embodiment, input images 111 are cropped or downsample or the like prior to being provided to non-linear transformer 102. However, the spatial image resolution of input images 111 is the same as that of reduced bit depth enhanced image 115. As shown, in an embodiment, the discussed processing is performed on only a luma channel (Y) of input images 111. For example, the luma channel may be channel of a YUV or YCbCr color space. However, the techniques used herein may be applied to any channel(s) of any color space.

Input image 111 is received by non-linear transformer 102 and non-linear transformer 102 applies a pretrained non-linear transform to input image 111 to generate a transformed image (Y') 112. As used herein, the term non-linear transform indicates any transform or mapping that provides an output that is not directly proportional to the input. The non-linear transform applied by non-linear transformer 102 may be any suitable non-linear transform. In an embodiment, the non-linear transform is a piece-wise linear transform. As used herein, the term piece-wise linear transform indicates a transform that uses straight line sections that together provide the non-linear transform. In an embodiment, the non-linear transform is a trainable gamma function. As used herein, the term trainable gamma function indicates a function defined by a power law expression (e.g., $Y_{out}=AV_{in}^{\gamma}$) such that A and $\gamma$ are trainable parameters. As discussed herein, the non-linear transform applied by non-linear transformer 102 is pretrained to optimize the performance of computer vision task network 105. In an embodiment, non-linear transformation is applied by non-linear transformer 102 to the luma (Y) channel of input image 111 to change the distribution of the signal such that the modified signal maximizes the performance of the computer vision task implemented by computer vision task network 105.

Transformed image 112 is transmitted to detail enhancer 103, which generates a detail enhanced image ($Y_{out}$) 114 using a pretrained details boosting factor ($\alpha$) 113. Details boosting factor ($\alpha$) 113 is also pretrained to maximize the performance of the computer vision task implemented by computer vision task network 105. As used herein, the term details boosting factor indicates a factor or value that is used to scale detected details of an image. In an embodiment, the details boosting factor is multiplied by the detected details of an image to enhance the details thereof. The term details of an image indicates an image (e.g., a details image) that contains detected details on a pixel-wise basis. The detected details may be detected or revealed from an image using any suitable technique or techniques discussed herein.

Figure 2:
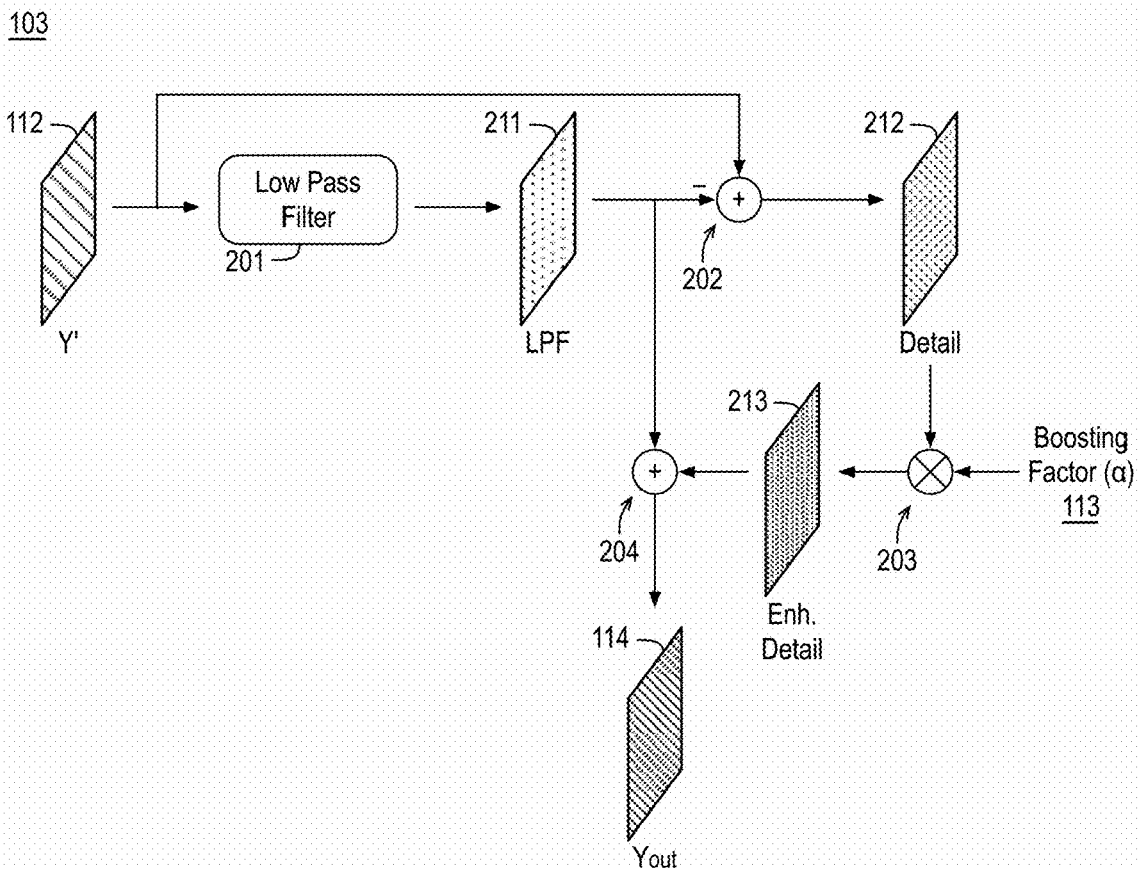
FIG. 2 illustrates an example image detail enhancer for use in implementing a pretrained details boosting factor.
Figure 3:
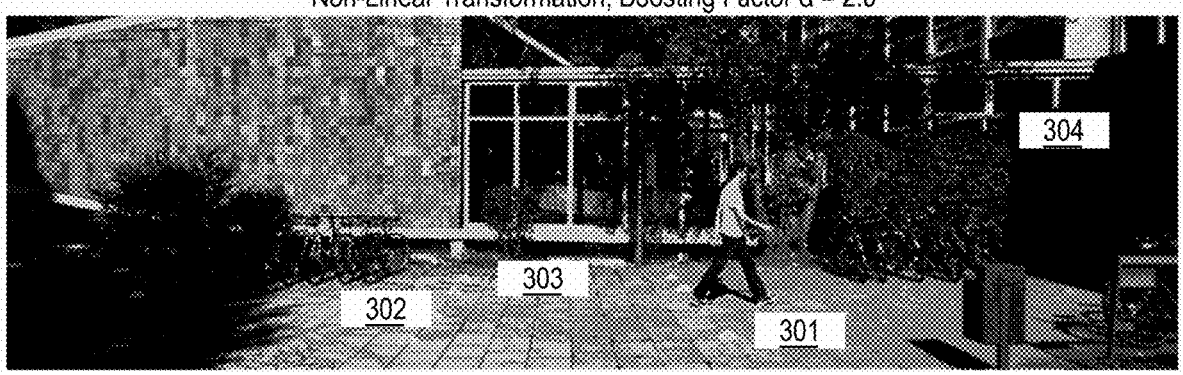
FIG. 3 illustrates an example reduced bit depth enhanced image.

FIG. 2 illustrates an example image detail enhancer 103 for use in implementing a pretrained details boosting factor, arranged in accordance with at least some implementations of the present disclosure. As shown in FIG. 3, detail enhancer 103 includes a low pass filter 201, a differencer 202, a multiplier 203, and an adder 204. As discussed with respect to FIG. 1, image detail enhancer 103 receives transformed image 112 and pretrained details boosting factor 113 and image detail enhancer 103 generates detail enhanced image 114.

Low pass filter 201 receives transformed image 112 and applies a low pass filter thereto to generate a low pass filtered image 211. Low pass filter 201 may be any suitable low pass filter. In an embodiment, low pass filter 201 is a box filter with a 5×5 pixel support region. For example, a box filter may offer the advantages of being computationally inexpensive to pipeline in implementation. Furthermore, a 5×5 pixel support region (e.g., a relatively small support region) offers enough support for generation of a high quality low pass filtered image 211 while being computationally inexpensive. For example, for a center pixel being filtered, the resultant filter may be an average or weighted average of the center pixel and the 24 neighboring pixels surrounding the center pixel. In an embodiment, low pass filter 201 is a box filter with a 3×3 or 7×7 pixel support region. Low pass filter 201 may be characterized as a box blur filter, a blur filter, etc. In an embodiment, a box filter is applied to transformed image 112 to generate a low-pass filtered signal as represented by low pass filtered image 211.

In an embodiment, low pass filter 201 generates low pass filtered image 211 as shown in Equation (1):

$$Y_{LPF}=BOX_{5\times5}(Y'_{in}) \qquad (1)$$

where $Y_{LPF}$ is low pass filtered image 211, $BOX_{5\times5}$ is an exemplary low pass box filter using a 5×5 support window, and $Y'_{in}$ is transformed image 112.

Differencer 202 receives transformed image 112 and low pass filtered image 211 and differencer 202 differences low pass filtered image 211 from transformed image 112 to provide details of transformed image 212. In an embodiment, differencer 202 determines pixel-wise differences between transformed image 112 and low pass filtered image 211 (e.g., transformed image 112 minus low pass filtered image 211) to provide details of transformed image 212. Details of transformed image 212 has the same spatial image resolution as transformed image 112 and low pass filtered image 211 and indicates detected or revealed details of transformed image 112. Details of transformed image 212 may be characterized as a transformed image details image, a details image, etc. For example, details of transformed image 212 (e.g., the difference of low pass filtered image 211 from transformed image 112) simulates a high pass filter result of transformed image 112.

In an embodiment, differencer 202 generates details of transformed image 212 as shown in Equation (2):

$$Y_{details} = Y'_{in} - Y_{LPF} \quad (2)$$

where $Y_{details}$ is details of transformed image 212, $Y'_{in}$ is transformed image 112, and $Y_{LPF}$ is low pass filtered image 211.

Multiplier 203 receives details of transformed image 212 and pretrained details boosting factor 113 and multiplier 203 multiplies each pixel of details of transformed image 212 with pretrained details boosting factor 113 to generate enhanced details of transformed image 213. In an embodiment, multiplier 203 determines pixel-wise products of pixel values of details of transformed image 212 and pretrained details boosting factor 113 (e.g., details of transformed image 212 times details boosting factor 113) to generate enhanced details of transformed image 213. As with details of transformed image 212, enhanced details of transformed image 213 has the same spatial image resolution as transformed image 112 and low pass filtered image 211 and indicates detected or revealed details of transformed image 112. Enhanced details of transformed image 213 may be characterized as an enhanced transformed image details image, an enhanced details image, etc. For example, enhanced details of transformed image 213 provides a boosted details signal from transformed image 112.

Adder 204 receives enhanced details of transformed image 213 and low pass filtered image 211 and adder 204 sums enhanced details of transformed image 213 and low pass filtered image 211 to generate enhanced image 114. In an embodiment, adder 204 determines pixel-wise sums for pixel values of enhanced details of transformed image 213 and low pass filtered image 211 (e.g., enhanced details of transformed image 213 plus low pass filtered image 211) to generate enhanced image 114. As discussed herein, enhanced image 114 has the same spatial image resolution as transformed image 112.

In an embodiment, multiplier 203 and adder 204 generate enhanced image 114 as shown in Equation (3):

$$Y_{out} = Y_{LPF} + \alpha \cdot Y_{details} \quad (3)$$

where $Y_{out}$ is enhanced image 114, $Y_{LPF}$ is low pass filtered image 211, $\alpha$ is details boosting factor 113, and $Y_{details}$ is details of transformed image 212.

Returning to FIG. 1, enhanced image 114 is transmitted to bit depth reducer 104, which reduces the bit depth of detail enhanced image 114 from a first bit depth to a second bit depth (lower than the first bit depth) to generate reduced bit depth enhanced image 115. Bit depth reducer 104 may reduce the bit depth of bit depth reducer 104 using any suitable technique or techniques such as a bit shift operation (e.g., a shift right operation). As with enhanced image 114, reduced bit depth enhanced image 115 has the same spatial image resolution as transformed image 112 and input image 111. In an embodiment, the boosted signal as provided by enhanced image 114 is downscaled in bit depth (but not spatial resolution) a desired number of bits by a bit shift operation.

The first bit depth and (reduced) second bit depth may be any suitable bit depths. In an embodiment, the first bit depth is 8 bits per pixel and the second bit depth is 4 bits per pixel. In an embodiment, the first bit depth is 8 bits per pixel and the second bit depth is 2 bits per pixel. In an embodiment, the first bit depth is 16 bits per pixel and the second bit depth is 8 bits per pixel. In an embodiment, the first bit depth is 16 bits per pixel and the second bit depth is 4 bits per pixel. In some embodiments, a ratio of the second bit depth to the first bit depth may be established and the bit depth may be reduced accordingly. In an embodiment, the second bit depth is not more than one-half of the first bit depth. In an embodiment, the second bit depth is not more than one-fourth of the first bit depth.

Reduced bit depth enhanced image 115 is transmitted to computer vision task network 105, applies a pretrained deep artificial neural network to reduced bit depth enhanced image 115 to generate one or more computer vision indicators 116 corresponding to a computer vision task implemented by computer vision task network 105. The computer vision task implemented by computer vision task network 105 may be any suitable computer vision task and computer vision indicators 116 may be any suitable corresponding indicators. In an embodiment, the computer vision task is object detection and computer vision indicators 116 include one or more detected objects and the position and class of the detected object(s) (e.g., person, building, automobile, etc.) thereof and, optionally, a confidence score of the classification. In an embodiment, the computer vision task is semantic image segmentation and computer vision indicators 116 include one or more pixel wise classifications (e.g., indicating what object the pixel is include in) or defined regions of the image and region based classifications. In an embodiment, the computer vision task is facial recognition and computer vision indicators 116 include one or more facial landmark locations. In addition or in the alternative, computer vision indicators 116 may include an indicator (e.g., yes or no) as to whether a predefined object or face is detected (e.g., for security purposes). Although discussed with respect to such exemplary uses for the sake of clarity of presentation, the computer vision task may be any high-level task based on use of a digital image. For example, the discussed visual tone mapping operator (i.e., including non-linear transformer 102, detail enhancer 103, and bit depth reducer 104) may be provided ahead of any type of computer vision task network, which may include, for example, a neural network, a fully connected neural network, a convolutional neural network, or combinations of layers of such networks.

As discussed with respect to FIG. 1, input images 111 may be luma only images and computer vision task network 105 may operate on such luma only images. In another embodiment, input images 111 are RGB images and the discussed operations are applied (separately) to each channel of the RGB images to generate a reduced bit depth channel for each of the R, G, and B channels (e.g., taking each channel from 8 bits per channel to 4 or 2 bits per channel) such that computer vision task network 105 then operates on a reduced bit depth RGB image. In another embodiment, input images 111 are RGB images that are transformed to the YUV color space, the discussed operations (e.g., prior to bit depth reduction) are performed only on the Y channel, the images are transformed back to the RGB color space, and per channel bit depth reduction is performed (e.g., taking each channel from 8 bits per channel to 4 or 2 bits per channel) such that computer vision task network 105 again operates on a reduced bit depth RGB image.

Furthermore, the pretrained non-linear transform applied by non-linear transformer 102, the pretrained details boosting factor applied by details enhancer 103, and the pretrained computer vision network applied by computer vision task network 105 are pretrained in conjunction with one another to perform the computer vision task at hand. That is, the discussed components are pretrained in the same instance (e.g., at the same time or in the same training phase) using the same training corpus. In an embodiment, the pretraining is performed in an end-to-end manner using, in series, the non-linear transform, the details boosting factor (in the context of detail enhancement), and the computer vision network such that a loss function is minimized for the resultant computer vision task using a training corpus with ground truth computer vision task result information. Other pretraining options that are also in conjunction with one another are discussed further herein below.

Figure 4:
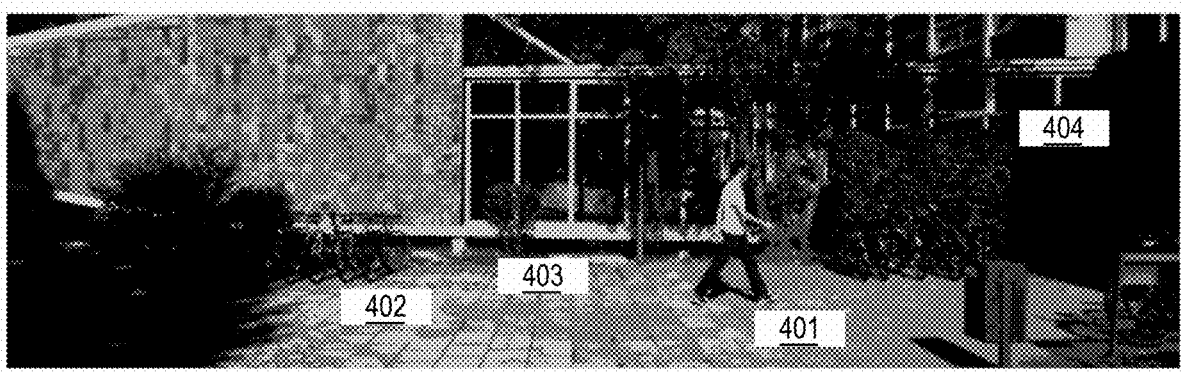
FIG. 4 illustrates an example reduced bit depth input image without enhancement.

FIG. 3 illustrates an example reduced bit depth enhanced image 115, arranged in accordance with at least some implementations of the present disclosure. FIG. 4 illustrates an example reduced bit depth input image 400 without enhancement, arranged in accordance with at least some implementations of the present disclosure. Notably, FIG. 3 illustrates a reduced bit depth enhanced image 115 and FIG. 4 illustrates a reduced bit depth input image without enhancement for the sake of contrast. As shown, exemplary reduced bit depth enhanced image 115 has had a pretrained non-linear transformation and a boosting factor of two ($\alpha$=2) applied thereto. Also, as shown with respect to person 301, bicycles 302, and building details 303, 304, reduced bit depth enhanced image 115 has enhanced sharpness and edges in those (and other) regions relative to the same person 401, bicycles 402, and building details 403, 404 of reduced bit depth input image 400 without enhancement processing. Thereby, reduced bit depth enhanced image 115 may provide for improved computer vision task implementation as discussed herein.

Figure 5:
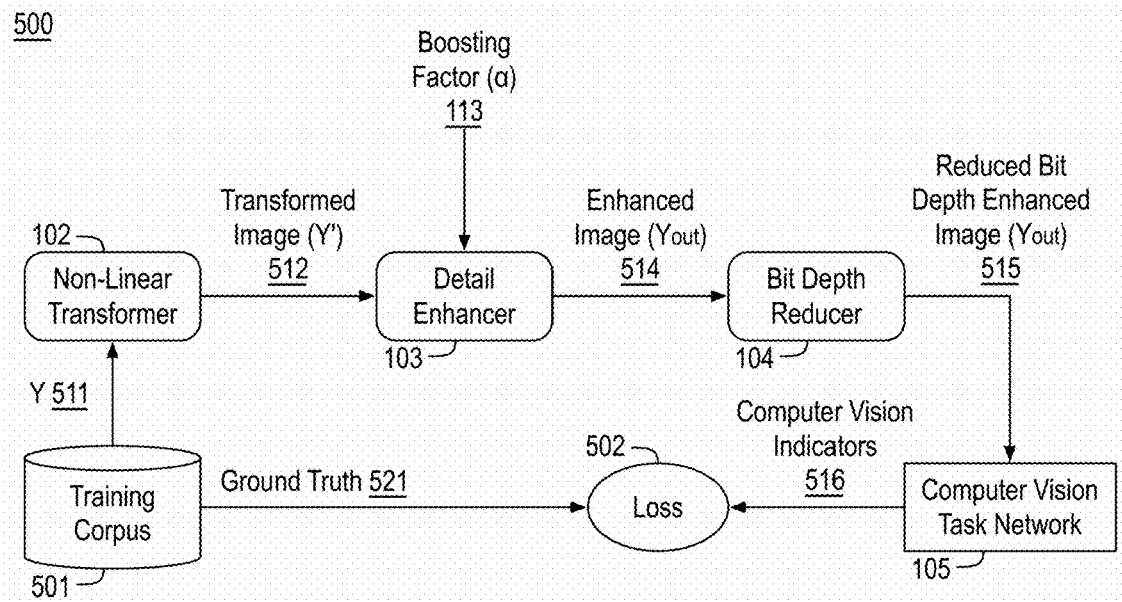
FIG. 5 illustrates an example system for pretraining a visual tone mapping operator and a computer vision task network.

FIG. 5 illustrates an example system 500 for pretraining a visual tone mapping operator and a computer vision task network, arranged in accordance with at least some implementations of the present disclosure. As shown in FIG. 5, device 500 includes a memory store 501 storing a training corpus, non-linear transformer 102, detail enhancer 103, bit depth reducer 104, and computer vision task network 105. Notably, non-linear transformer 102, detail enhancer 103, bit depth reducer 104, and computer vision task network 105 may be pretrained using system 500 (e.g., in a training phase) and transmitted to one or more device (e.g., device 100) for implementation (e.g., in an inference phase). Such transmission of non-linear transformer 102, detail enhancer 103, bit depth reducer 104, and computer vision task network 105 may be performed using any suitable technique or techniques such as saving the architecture and parameters of non-linear transformer 102, detail enhancer 103, bit depth reducer 104, and computer vision task network 105 and transmitting them to device 100. Although illustrated with the same numerals for the sake of clarity of presentation, non-linear transformer 102, detail enhancer 103, bit depth reducer 104, and computer vision task network 105 are not fully formed until training is complete, however they perform operations in the same manner using training parameters until convergence (at which point the parameters are saved as final parameters).

The training corpus stored by memory store 501 may include any training corpus for training computer vision task to be performed by computer vision task network 105. During training, input images 511 of the training corpus are received by non-linear transformer 102, which begins with default or randomly selected parameters and applies a non-linear transform (as discussed herein) to input images 511 to generate transformed images (Y') 512. Detail enhancer 103 generates detail enhanced images ($Y_{out}$) 514 using a details boosting factor ($\alpha$) 113 (as discussed herein), which, to begin training may begin with a default or randomly selected value. As shown, bit depth reducer 104 (which does not have any pretrained parameters but instead has a predetermined bit rate reduction) reduces the bit depth of detail enhanced images 514 (as discussed herein) from a first bit depth to a second bit depth (lower than the first bit depth) to generate reduced bit depth enhanced images 515.

Reduced bit depth enhanced images 515 are provided to computer vision task network 105. In an embodiment, computer vision task network 105 is also being trained along with non-linear transformer 102 and details boosting factor 113. That is, in some embodiments, non-linear transformer 102, detail enhancer 103, bit depth reducer 104, and computer vision task network 105 are trained in an end-to-end manner such that each begin with default or random parameters (or they are otherwise initialized) and, through epochs of training, such parameters are tuned until convergence is met. For example, after application of a computer vision network by computer vision task network 105 (as discussed herein), computer vision indicators 516 are generated. Computer vision indicators 516, via a loss function 502, are compared with ground truth indicators 521 as defined by the training corpus.

The parameters of the non-linear transform, the details boosting factor, and the parameters of the computer vision task network are then updated using any suitable technique or techniques. For example, a gradient may be calculated using partial derivatives with respect to each of the parameters of the end-to-end network (including the parameters of the non-linear transform, the details boosting factor, and the parameters of the computer vision task network) and the loss measurement may be propagated backwards through the architecture to update the discussed parameters. Such processing is then repeated until a convergence condition is met. The convergence condition may be the loss being less than a predetermined threshold, a maximum number of training cycles being met, etc.

In other embodiments, computer vision task network 105 was previously trained (using full bit depth or reduced bit depth) and non-linear transformer 102 and details boosting factor 113 are being pretrained to the previously trained computer vision task network. That is, in some embodiments, the computer vision network is pretrained using a first training corpus to generate the pretrained computer vision network. Then, the pretrained non-linear transform as applied by non-linear transformer 102 and the details boosting factor as applied by detail enhancer 103 are subsequently pretrained using the training corpus as stored by memory store 501, which is applied in an end-to-end manner to the pretrained non-linear transform, details boosting factor, and computer vision network without change to the pretrained computer vision network. For example, after application of a computer vision network by computer vision task network 105 (as discussed herein), computer vision indicators 516 are generated. Computer vision indicators 516, via a loss function 502, are compared with ground truth indicators 521 as defined by the training corpus. The parameters of only the non-linear transform and the details boosting factor (but not, the parameters of the computer vision task network) are then updated using any suitable technique or techniques. For example, a gradient may be determined based on the loss measurement (as determined during the discussed forward propagation) and the gradient may be used to backward propagate the loss measurement. For example, the gradient may be calculated using partial derivatives with respect to each of the available parameters of the end-to-end network (including the parameters of the non-linear transform and the details boosting factor) and the loss measurement may be propagated backwards through the architecture to update the discussed parameters. Such processing is then repeated until a convergence condition is met. The convergence condition may be the loss being less than a predetermined threshold, a maximum number of training cycles being met, etc.

Figure 6:
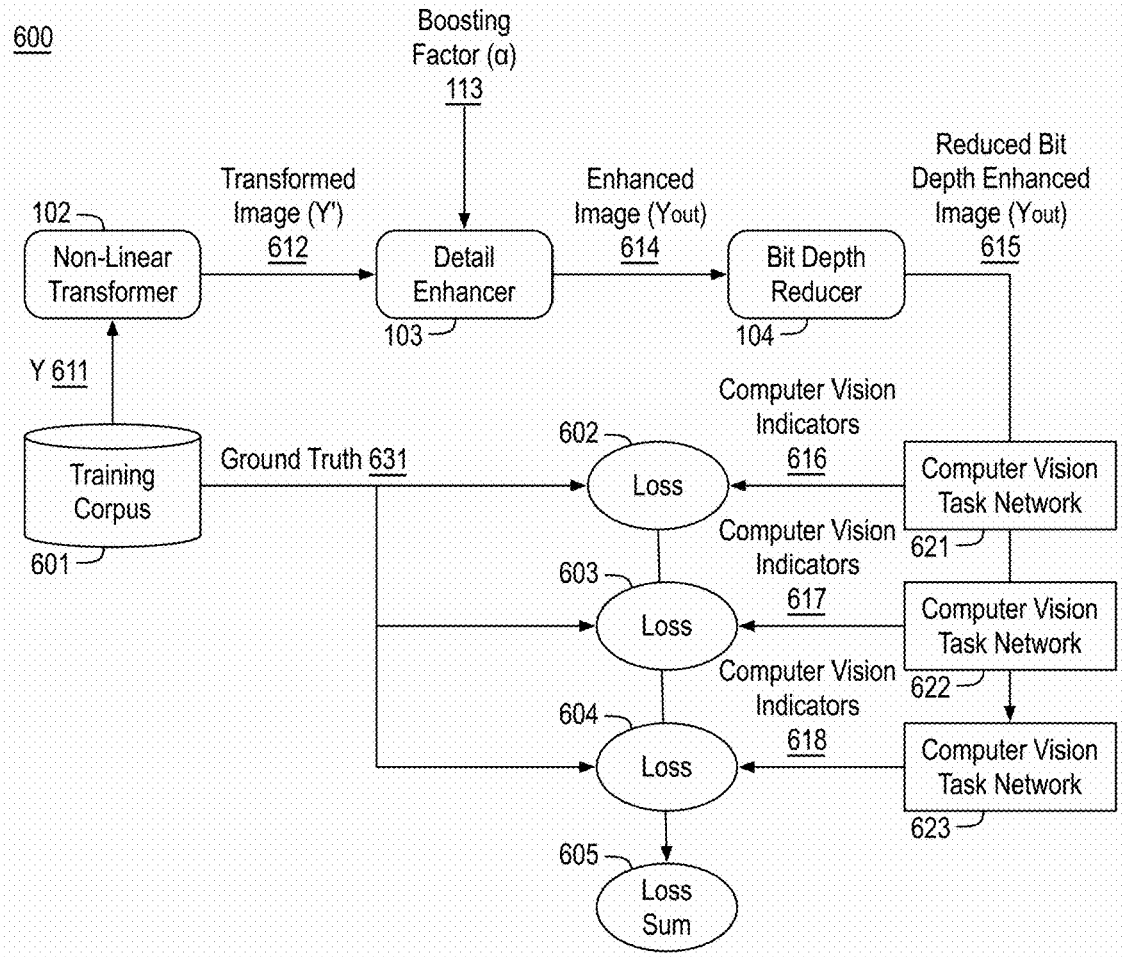
FIG. 6 illustrates an example system for pretraining a visual tone mapping operator and multiple computer vision task networks.

FIG. 6 illustrates an example system 600 for pretraining a visual tone mapping operator and multiple computer vision task networks, arranged in accordance with at least some implementations of the present disclosure. As shown in FIG. 6, device 600 includes a memory store 601 storing training corpuses, non-linear transformer 102, detail enhancer 103, bit depth reducer 104, and computer vision task network 105. As discussed, non-linear transformer 102, detail enhancer 103, bit depth reducer 104, and computer vision task network 105 may be pretrained using system 600 and transmitted to one or more device (e.g., device 100) for implementation. As above, although illustrated with the same numerals for the sake of clarity of presentation, non-linear transformer 102, detail enhancer 103, bit depth reducer 104, and computer vision task network 105 are not fully formed until training is complete, however they perform operations in the same manner using training parameters until convergence (at which point the parameters are saved as final parameters).

The training corpuses stored by memory store 601 may include any training corpuses for training computer vision tasks to be performed by computer vision task networks 621, 622, 623, such that each performs a different task or implements a different network to perform the same or similar tasks. During training, input images 611 of the training corpus are received by non-linear transformer 102, which begins with default or randomly selected parameters and applies a non-linear transform (as discussed herein) to input images 611 to generate transformed images (Y') 612. Detail enhancer 103 generates detail enhanced images ($Y_{out}$) 614 using a details boosting factor ($\alpha$) 113 (as discussed herein), which, to begin training may begin with a default or randomly selected value. As shown, bit depth reducer 104 (which does not have any pretrained parameters but instead has a predetermined bit rate reduction) reduces the bit depth of detail enhanced images 614 (as discussed herein) from a first bit depth to a second bit depth (lower than the first bit depth) to generate reduced bit depth enhanced images 615.

Reduced bit depth enhanced images 615 are provided to one or more of computer vision task networks 621, 622, 623. Although illustrated with three computer vision task networks 621, 622, 623 (and corresponding loss functions 602, 603, 604), any number may be used. As discussed with respect to FIG. 5, computer vision task networks 621, 622, 623 may be trained along with non-linear transformer 102 and details boosting factor 113 or they may be previously trained and only non-linear transformer 102 and details boosting factor 113 may be trained (without change to computer vision task networks 621, 622, 623).

In either case, after application of a computer vision networks by one or more of computer vision task networks 621, 622, 623 (as discussed herein), computer vision indicators 616, 617, 618 are generated. Computer vision indicators 616, via a loss function 602, are compared with pertinent indicators from ground truth indicators 631 as defined by the training corpus to generate a loss measurement for computer vision task network 621. Furthermore, computer vision indicators 617, via a loss function 603, are compared with pertinent indicators from ground truth indicators 631 as defined by the training corpus to generate a loss measurement for computer vision task network 612 and computer vision indicators 618, via a loss function 604, are compared with pertinent indicators from ground truth indicators 631 as defined by the training corpus to generate a loss measurement for computer vision task network 613. As shown, the loss measurements are summed or combined to generate a total loss.

The parameters of the non-linear transform, the details boosting factor, and the parameters of the computer vision task networks (or just the parameters of the non-linear transform and the details boosting factor) are then updated using any suitable technique or techniques. For example, a gradient may be calculated using partial derivatives with respect to each of the available parameters of the end-to-end network and the loss measurement may be propagated backwards through the architecture to update the discussed parameters. Such processing is then repeated until a convergence condition is met. The convergence condition may be the loss being less than a predetermined threshold, a maximum number of training cycles being met, etc.

Figure 7:
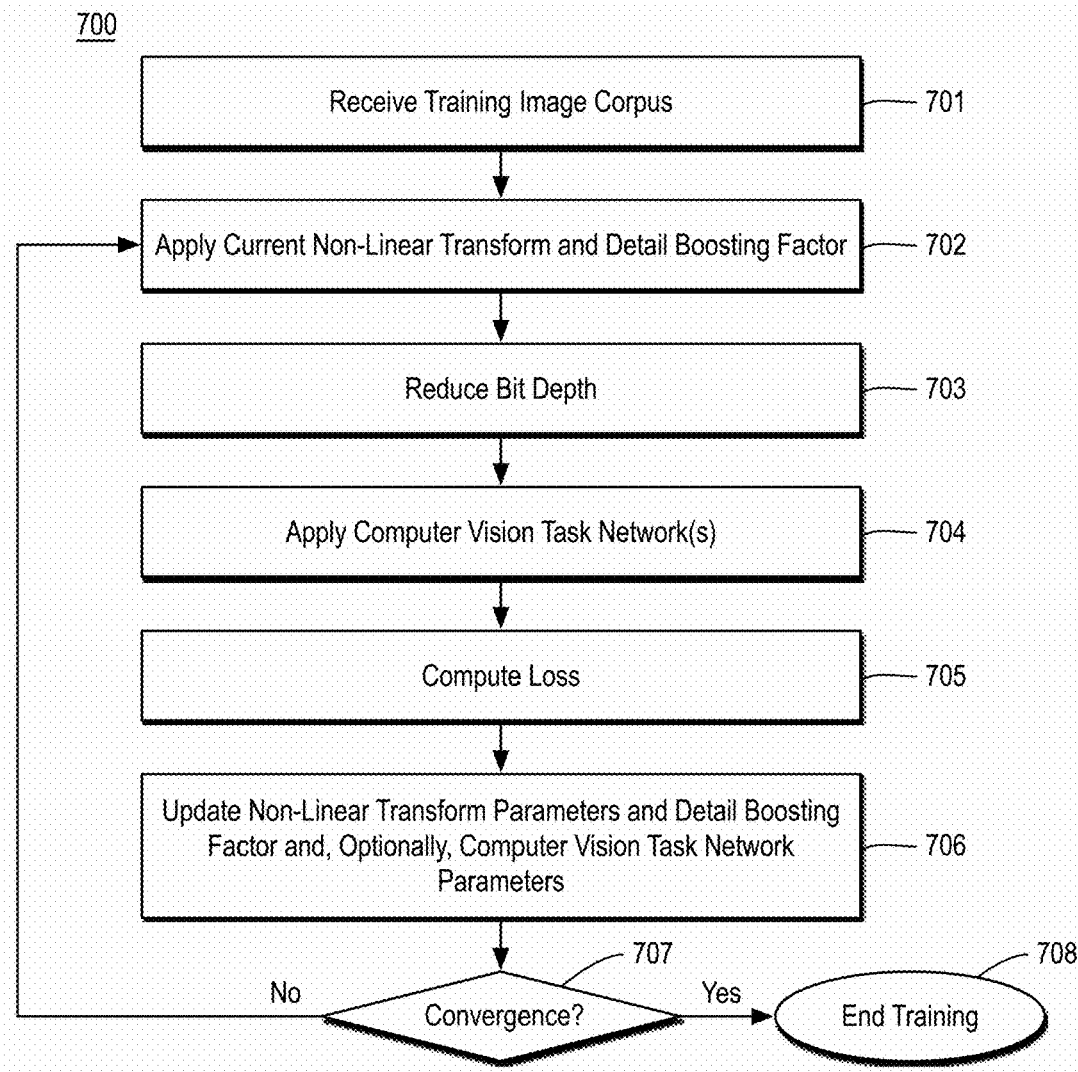
FIG. 7 is a flow diagram illustrating an example process for training a non-linear transform and a details boosting factor for use with one or more computer vision task networks.

FIG. 7 is a flow diagram illustrating an example process 700 for training a non-linear transform and a details boosting factor for use with one or more computer vision task networks, arranged in accordance with at least some implementations of the present disclosure. Process 700 may include one or more operations 701-708 as illustrated in FIG. 7. Process 700 may be performed by any device or system discussed herein to train any non-linear transform and a details boosting factor and, optionally, computer vision task network discussed herein. Process 700 or portions thereof may be repeated for any training, training sets, etc. The parameters generated by process 700 may be stored to memory and implemented via a processor of device 100 during inference, for example.

Process 700 begins at operation 701, where a training corpus of images are attained. For example, the training corpus may include sets of images that provide a ground truth for training for the one or more computer vision task networks being implemented. The training corpus may include any number of images, such as 10 k images, 1M images, or more. In an embodiment, the images of the training corpus have the same resolution and each image is of the same format, such as any format discussed with respect to input images 111.

Processing continues at operation 702, where a current non-linear transform and detail boosting factor are applied to one or more images of the training corpus as discussed herein to generate corresponding enhanced images. For example, the current non-linear transform may include current parameters (e.g., initial or updated at subsequent training epochs) applied using a non-linear transformation defined as part of the architecture of a visual tone mapping operator to be applied before a computer vision task network. Similarly, the current detail boosting factor may include an initial or updated detail boosting factor applied to image details as discussed herein with respect to FIG. 2.

Processing continues at operation 703, where the bit depth of the enhanced images generated at operation 702 is reduced from a first bit depth (e.g., 8 bits) to a second bit depth (e.g., 4 or 2 bits) less than the first bit depth. The first and second bit depths may be any bit depths discussed herein and may be predefined as part of the architecture of the a visual tone mapping operator.

Processing continues at operation 704, where one or more computer vision task networks are applied to the reduced bit depth enhanced images generated at operation 703. As discussed, in some embodiments, a single computer vision task network is implemented in training and, in other embodiments, multiple computer vision task networks are implemented in training. Such application of the one or more computer vision task networks generates computer vision indicators that may be compared with ground truth information corresponding to the training corpus attained at operation 701.

Processing continues at operation 705, where a loss is generated using the computer vision indicators generated at operation 704 and the ground truth computer vision indicators corresponding to the training corpus. The loss may be generated using any suitable cost function. In embodiments where a single computer vision task network is implemented, the loss corresponds to the loss of the computer vision indicators generated by the single computer vision task network and the ground truth information. In embodiments where multiple computer vision task network are implemented, the loss corresponds to the sum or combination of the loss of each set of computer vision indicators generated by each of the computer vision task networks as compared to the ground truth information.

Processing continues at operation 706, where the non-linear transform parameters and the detail boosting factor and, if the one or more computer vision task networks are being concurrently trained, the parameters thereof are updated. Such parameters may be updated using any suitable technique or techniques. In an embodiment, a gradient is determined based on the single or multi-loss measurement and the gradient is used to backward propagate the single or multi-loss measurement. For example, the gradient may be calculated using partial derivatives with respect to each of the available parameters of the architecture and the available parameters are modified using the gradient.

Processing continues at decision operation 707, where a determination is made as to whether a convergence is detected. If so, process 700 ends at end operation 708. If not, processing continues at operation 702 where another image or group of images are selected processing continues as discussed until convergence is met. The convergence decision may be based on the single or multi-loss measurement meeting a threshold, a maximum number of iterations being reached, etc.

Figure 8:
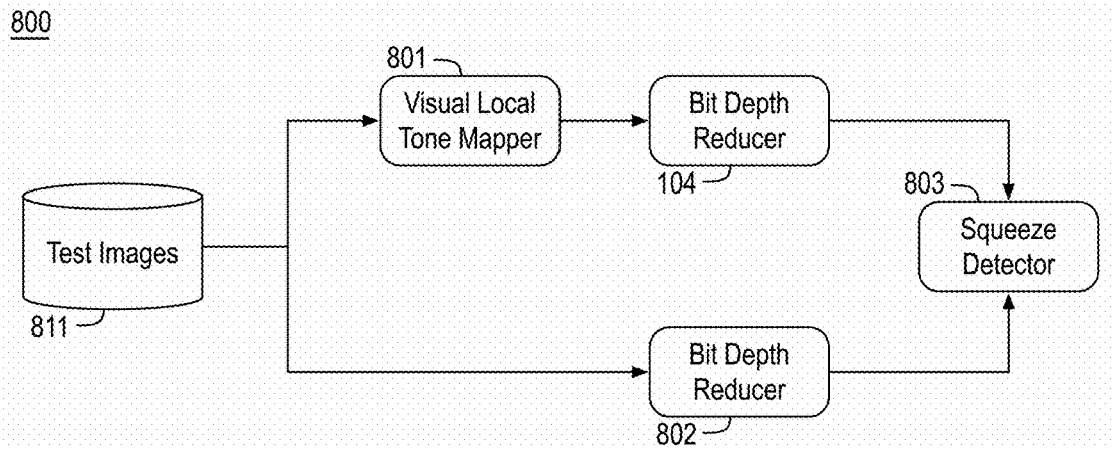
FIG. 8 is a block diagram illustrating an example system for testing the performance of an exemplary vision local tone mapper.

FIG. 8 is a block diagram illustrating an example system 800 for testing the performance of an exemplary vision local tone mapper, arranged in accordance with at least some implementations of the present disclosure. As shown in FIG. 8, a visual local tone mapper 801 (e.g., including non-linear transformer 102 and detail enhancer 103) processes test images 811 as discussed herein. The resultant enhanced images (e.g., $Y_{out}$) are processed by bit depth reducer 104 to reduce the bit depth thereof. Furthermore, test images 811 are processed by a bit depth reducer 802 that performs the same bit depth reduction as bit depth reducer 104. The resultant reduced bit depth images (e.g., enhanced from bit depth reducer 104 and not enhanced from bit depth reducer 802) are each provided to a squeeze detector 803, which applies the same computer vision task network to the enhanced and not enhanced reduced bid depth images such that the performance thereof can be compared.

For example, squeeze detector 803 implements Squeeze-Det+ for feature extraction. Furthermore, a trainable gamma function was used for the non-linear transform implemented by visual local tone mapper 801. Since the SqueezeDet+ network was trained using an 8-bit input, after reducing the bit depth of the output of visual local tone mapper 801, the output was stretched back to occupy 8-bits such that the input occupies 8-bits but is of lower resolution when compared to the original input used to train the network. As a reference, the input bit depth of test images 811 was scaled down without applying any non-linear transform or detail enhancement, as shown, and the input was then stretched back to 8-bits. After training end-to-end for both paths with inputs in the RGB color space, it was observed that with visual local tone mapping, the detection performance (given by the mean average precision), for data scaled to 2 bits per pixel improved by about 14% (from 69.4% to 79.1%) if the network was trained from scratch. Therefore, using the vision local tone mapper, the result was a 4× savings in power such that power consumption can be reduced by a factor of 4 while retaining accuracy. In other contexts, object detection improved for 8 bit enhanced images improved by about 0.48% (from 0.832 to 0.836) with use of the vision local tone mapper, object detection improved for 4 bit enhanced images improved by about 1.21% (from 0.826 to 0.836) with use of the vision local tone mapper, and object detection improved for 2 bit enhanced images improved by about 5.08% (from 0.787 to 0.827) with use of the vision local tone mapper over the same bit depths without use of the vision local tone mapper.

Figure 9:
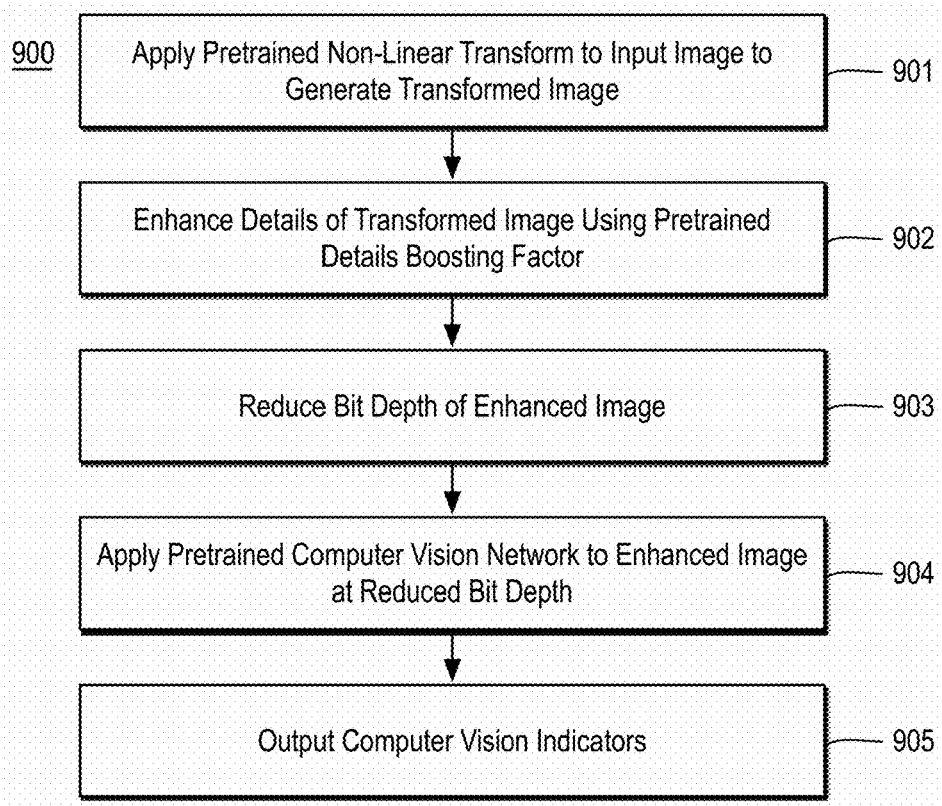
FIG. 9 is a flow diagram illustrating an example process for performing a computer vision task by implementing a vision local tone mapper and computer vision task network.

FIG. 9 is a flow diagram illustrating an example process 900 for performing a computer vision task by implementing a vision local tone mapper and computer vision task network, arranged in accordance with at least some implementations of the present disclosure. Process 900 may include one or more operations 901-905 as illustrated in FIG. 9. Process 900 may form at least part of a computer vision or artificial intelligence process. By way of non-limiting example, process 900 may form at least part of a computer vision or artificial intelligence process as performed by device 100 as discussed herein during an implementation or inference phase. Furthermore, process 900 will be described herein with reference to system 1000 of FIG. 10.

Figure 10:
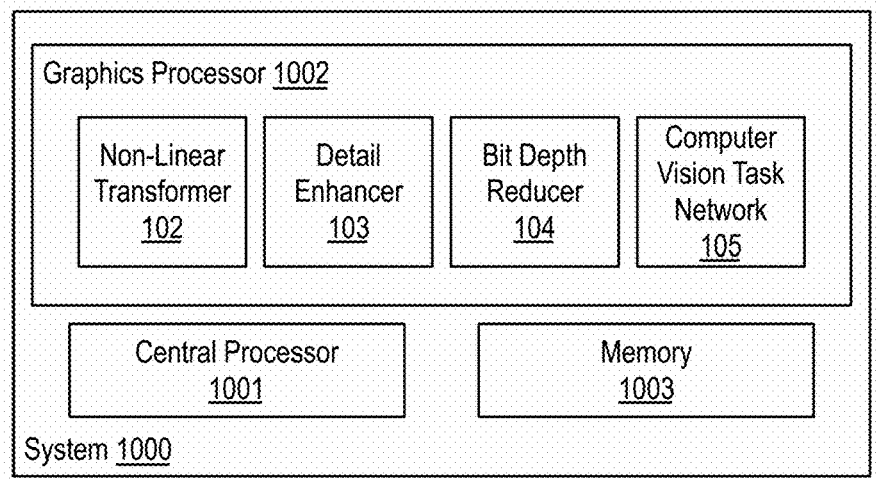
FIG. 10 is an illustrative diagram of an example system for performing a computer vision task by implementing a vision local tone mapper and computer vision task network.

FIG. 10 is an illustrative diagram of an example system 1000 for performing a computer vision task by implementing a vision local tone mapper and computer vision task network, arranged in accordance with at least some implementations of the present disclosure. As shown in FIG. 10, system 1000 may include one or more central processing units (CPU) 1001, a graphics processing unit 1002, and memory stores 1003. Also as shown, graphics processing unit 1002 may include or implement non-linear transformer 102, detail enhancer 103, bit depth reducer 104, and computer vision task network 105. Such components or modules may be implemented to perform operations as discussed herein. In the example of system 1000, memory stores 1003 may store input image data, transformed image data, boosting factors, enhanced image data, reduced bit depth enhanced image data, computer vision indicators, or any other data or data structure discussed herein.

As shown, in some examples, non-linear transformer 102, detail enhancer 103, bit depth reducer 104, and computer vision task network 105 are implemented via graphics processing unit 1002. In other examples, one or more or portions of non-linear transformer 102, detail enhancer 103, bit depth reducer 104, and computer vision task network 105 are implemented via central processing units 1001 or an image processing unit (not shown) of system 1000. In yet other examples, one or more or portions of non-linear transformer 102, detail enhancer 103, bit depth reducer 104, and computer vision task network 105 are implemented via an imaging processing pipeline, graphics pipeline, or the like.

Graphics processing unit 1002 may include any number and type of graphics processing units that may provide the operations as discussed herein. Such operations may be implemented via software or hardware or a combination thereof. For example, graphics processing unit 1002 may include circuitry dedicated to manipulate frame data, object detection architecture data, etc. obtained from memory stores 1003. Central processing units 1001 may include any number and type of processing units or modules that may provide control and other high level functions for system 1000 and/or provide any operations as discussed herein. Memory stores 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1003 may be implemented by cache memory. In an embodiment, one or more or portions of non-linear transformer 102, detail enhancer 103, bit depth reducer 104, and computer vision task network 105 are implemented via an execution unit (EU) of graphics processing unit 1002. The EU may include, for example, programmable logic or circuitry such as a logic core or cores that may provide a wide array of programmable logic functions. In an embodiment, one or more or portions of non-linear transformer 102, detail enhancer 103, bit depth reducer 104, and computer vision task network 105 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of one or more non-linear transformer 102, detail enhancer 103, bit depth reducer 104, and computer vision task network 105 are implemented via an application specific integrated circuit (ASIC). The ASIC may include an integrated circuitry customized to perform the operations discussed herein.

Returning to discussion of FIG. 9, process 900 begins at operation 901, where a pretrained non-linear transform is applied to an input image to generate a transformed image. The input image may be have any suitable spatial resolution and may include any of one or more color channels. In an embodiment, the input image includes only a luma (Y) channel and the non-linear transform is applied to the luma channel. In an embodiment, the input image includes multiple channels (e.g., RGB channels) and the non-linear transform is applied to each of the channels. Furthermore, the non-linear transform may be any suitable non-linear transform. In an embodiment, the pretrained non-linear transform is a piece-wise linear function. In an embodiment, the pretrained non-linear transform is a trainable gamma function. In an embodiment, the pretrained non-linear transform is a trainable sigmoid function. In an embodiment, the pretrained non-linear transform is or a convolutional neural network layer.

Processing continues at operation 902, where details of the transformed image are enhanced by applying a pretrained details boosting factor to image details of the transformed image to generate an enhanced image. The details of the transformed image may be detected or revealed using any suitable technique or techniques. In an embodiment, enhancing details of the transformed image to generate the enhanced image includes applying a low-pass filter to the transformed image to generate a low pass filtered image, differencing the low pass filtered image from the transformed image to provide the details of the transformed image, multiplying the details of the transformed image by the pretrained details boosting factor to generate enhanced details of the transformed image, and summing the low pass filtered image and the enhanced details of the transformed image to generate the enhanced image. The low-pass filter may be any suitable filter such as a box filter having a 5×5 pixel support region.

Processing continues at operation 903, where a bit depth of the enhanced image is reduced from a first bit depth to a second bit depth less than the first bit depth. The bit depth may be reduced using any suitable technique or techniques such as bit shift operations. In embodiments where the input image includes only a luma channel and the computer vision network (discussed with respect to operation 904) accepts only a luma channel, the bit reduction is applied to the luma channel. In embodiments where the input image includes a luma channel and the computer vision network accepts a luma channel and chroma channels (U, V), the bit reduction is applied to each of the luma channel and chroma channels. In embodiments where the input image includes multiple channels (e.g., RGB channels) and the computer vision network accepts multiple channels (e.g., RGB channels), the bit reduction is applied to each of the multiple channels. In other embodiments, a the pretrained non-linear transform and detail enhancement are applied only to the luma channel of an image having a luma and chroma channels (e.g., a YUV image), the image is converted to the RGB color space, and each of the multiple (RGB) channels have their bit depths reduced. The bit depth reduction may be by any amount. In an embodiment, the second bit depth is not more than one-half of the first bit depth. In an embodiment, the second bit depth is not more than one-fourth of the first bit depth.

Processing continues at operation 904, where a pretrained computer vision network is applied to the enhanced image at the second bit depth to generate one or more computer vision indicators corresponding to a computer vision task for the input image such that the pretrained non-linear transform, details boosting factor, and computer vision network are pretrained in conjunction with one another to perform the computer vision task. The pretrained computer vision network may include any suitable deep artificial neural network such as a neural network, a fully connected neural network, a convolutional neural network, or combinations of layers of such networks. In an embodiment, the pretrained non-linear transform, details boosting factor, and computer vision network are pretrained in an end-to-end manner using a training corpus. In an embodiment, the pretrained non-linear transform, details boosting factor, and computer vision network are pretrained, based on a training corpus, further in conjunction with one or more additional computer vision networks to minimize a shared minimization function across the pretrained computer vision network and the one or more additional computer vision networks. In an embodiment, the computer vision network is pretrained using a first training corpus to generate the pretrained computer vision network and the pretrained non-linear transform and details boosting factor are subsequently pretrained using a second training corpus as applied in an end-to-end manner to the pretrained non-linear transform, details boosting factor, and computer vision network without change to the pretrained computer vision network. In an embodiment, the input image, the enhanced image at the first bit depth, and the enhanced image at the second bit depth all have the same spatial image resolution.

Processing continues at operation 905, where the computer vision indicators corresponding to the input image are output to any suitable component (e.g., of system 1000), to memory, to another device, to a display for presentation to a user, etc. The computer vision indicators may be any suitable indicators for the computer vision task at hand. In an embodiment, the computer vision indicators include a detected object classification. In an embodiment, the computer vision indicators include a semantic segmentation classification. In an embodiment, the computer vision indicators include a facial landmark.

Process 900 may generate computer vision indicators based on an input image. Process 900 may be repeated any number of times either in series or in parallel for any number of input images, video frames, video sequences, etc. As discussed, process 900 may provide for high quality computer vision task performance while reducing hardware area, power, and data transport due to reducing the bit depth of the input image to the computer vision task network.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
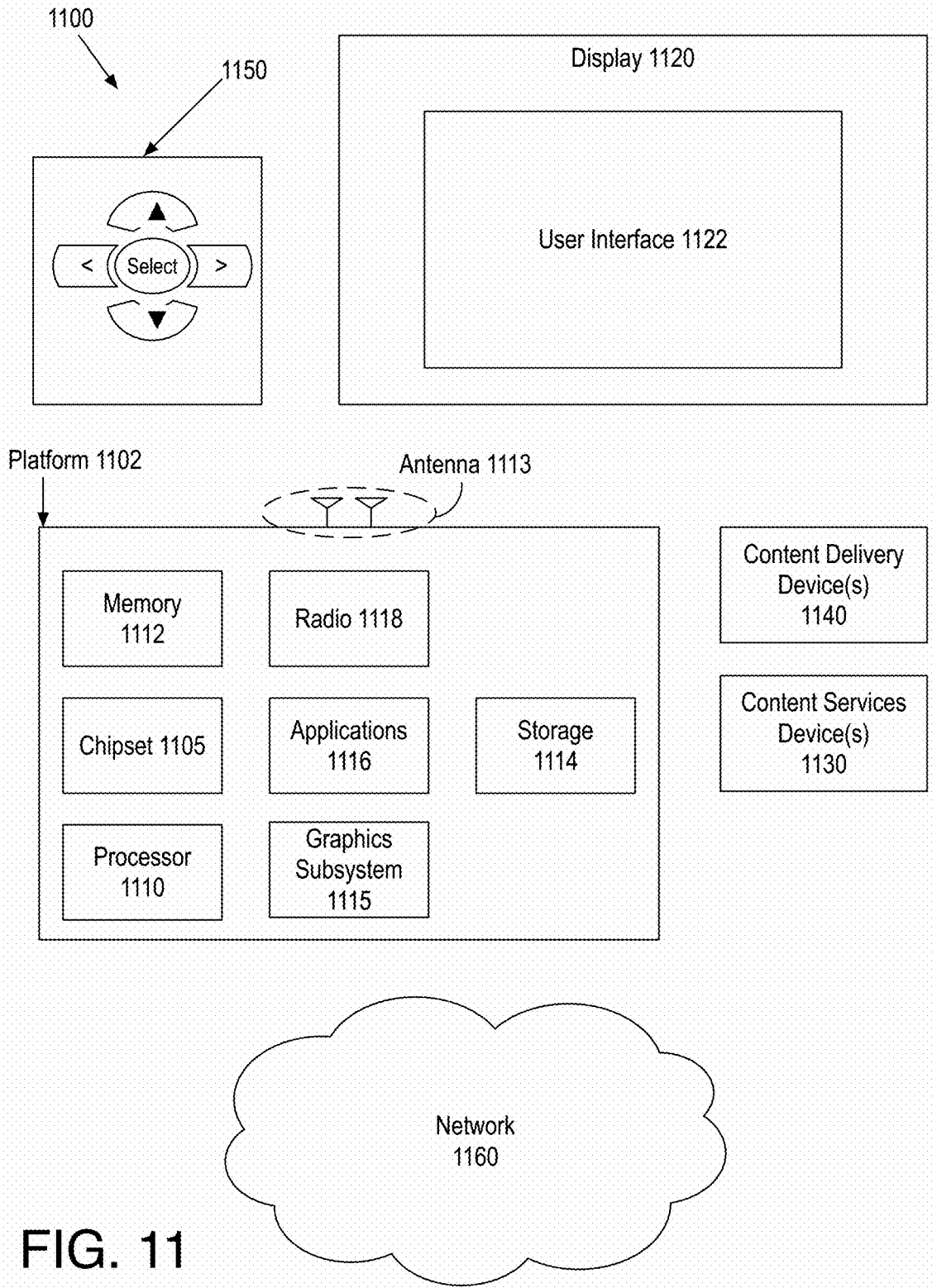
FIG. 11 is an illustrative diagram of an example system.

FIG. 11 is an illustrative diagram of an example system 1100, arranged in accordance with at least some implementations of the present disclosure. In various implementations, system 1100 may be a computing system although system 1100 is not limited to this context. For example, system 1100 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 1100 includes a platform 1102 coupled to a display 1120. Platform 1102 may receive content from a content device such as content services device(s) 1130 or content delivery device(s) 1140 or other similar content sources such as a camera or camera module or the like. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still images, graphics, or video for display. Graphics subsystem 1115 may be a graphics processing unit (GPU), a visual processing unit (VPU), or an image processing unit, for example. In some examples, graphics subsystem 1115 may perform scanned image rendering as discussed herein. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any flat panel monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 10.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
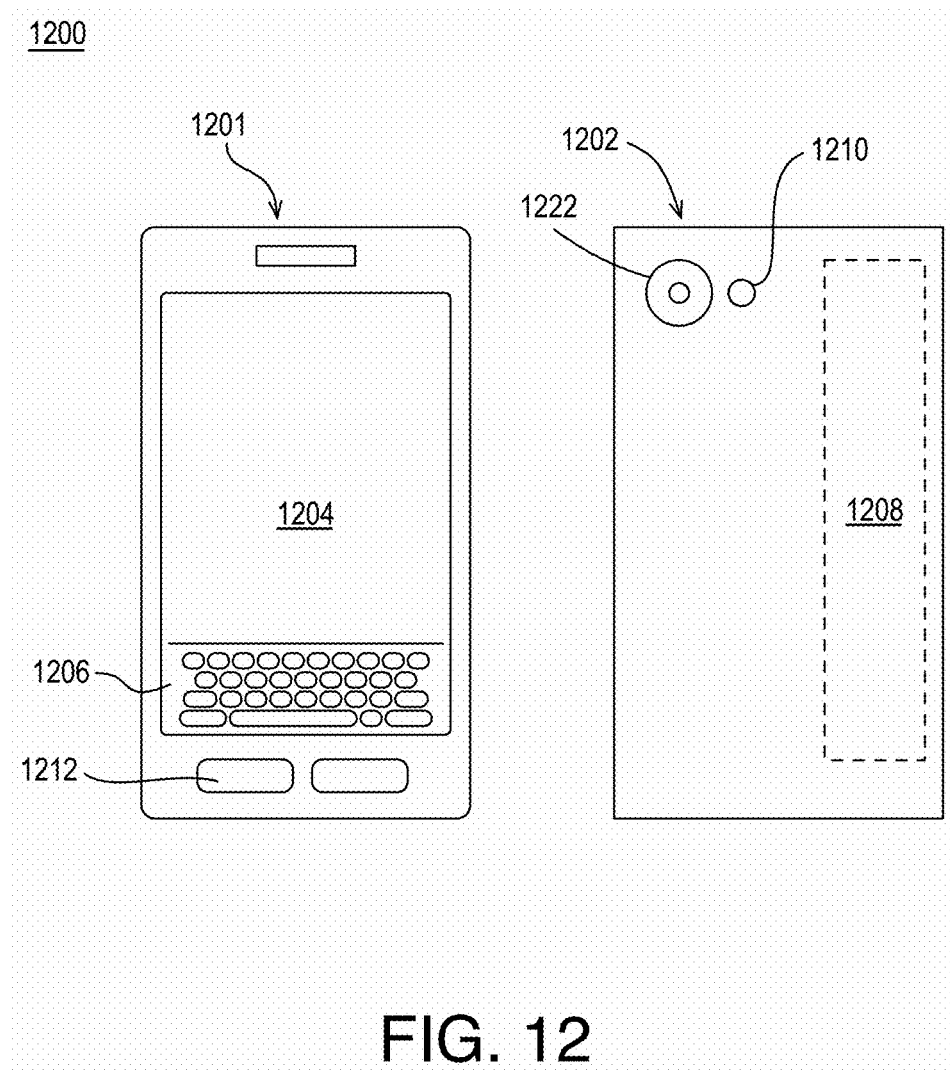
FIG. 12 illustrates an example device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, other systems, components, or modules discussed herein or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, a color camera 1222, and an integrated antenna 1208. For example, color camera 1222 may attain video frames for processing as discussed herein. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include color camera 1222 and a flash 1210 integrated into back 1202 (or elsewhere) of device 1200. In other examples, color camera 1222 and flash 1210 may be integrated into front 1201 of device 1200 or both front and back sets of cameras may be provided. Color camera 1222 and flash 1210 may be components of a camera module to originate color image data with IR texture correction that may be processed into an image or streaming video that is output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for performing a computer vision task comprising:
    a memory to store an input image; and
    one or more processors coupled to the memory, the one or more processors to:
        apply a pretrained non-linear transform to the input image to generate a transformed image;
        enhance details of the transformed image based at least in part on application of a pretrained details boosting factor to image details of the transformed image to generate an enhanced image;
        reduce a bit depth of the enhanced image from a first bit depth to a second bit depth;
        apply a pretrained computer vision network to the enhanced image at the second bit depth to generate one or more computer vision indicators corresponding to a computer vision task for the input image, wherein the pretrained non-linear transform, details boosting factor, and computer vision network are pretrained in conjunction with one another to perform the computer vision task; and
        output the computer vision indicators corresponding to the input image.

2. The system of claim 1, wherein the one or more processors to enhance details of the transformed image to generate the enhanced image comprises the one or more processors to:
    apply a low-pass filter to the transformed image to generate a low pass filtered image;
    difference the low pass filtered image from the transformed image to provide the details of the transformed image;
    multiply the details of the transformed image by the pretrained details boosting factor to generate enhanced details of the transformed image; and
    sum the low pass filtered image and the enhanced details of the transformed image to generate the enhanced image.

3. The system of claim 2, wherein the low-pass filter comprises a box filter.

4. The system of claim 1, wherein the pretrained non-linear transform, details boosting factor, and computer vision network are pretrained in an end-to-end manner using a training corpus.

5. The system of claim 1, wherein the pretrained non-linear transform, details boosting factor, and computer vision network are pretrained, based on a training corpus, further in conjunction with one or more additional computer vision networks to minimize a shared minimization function across the pretrained computer vision network and the one or more additional computer vision networks.

6. The system of claim 1, wherein the computer vision network is pretrained using a first training corpus to generate the pretrained computer vision network and the pretrained non-linear transform and details boosting factor are subsequently pretrained using a second training corpus as applied in an end-to-end manner to the pretrained non-linear transform, details boosting factor, and computer vision network without change to the pretrained computer vision network.

7. The system of claim 1, wherein the pretrained non-linear transform is one of a piece-wise linear function, a trainable gamma function, a trainable sigmoid function, or a convolutional neural network layer.

8. The system of claim 1, wherein the second bit depth is not more than one-fourth of the first bit depth.

9. The system of claim 1, wherein the input image comprises only a luma channel, and wherein the input image, the enhanced image at the first bit depth, and the enhanced image at the second bit depth all have the same spatial image resolution.

10. The system of claim 1, wherein the computer vision indicators comprises at least one of a detected object classification, a semantic segmentation classification, or a facial landmark.

11. A computer-implemented method for performing a computer vision task comprising:
    applying a pretrained non-linear transform to an input image to generate a transformed image;
    enhancing details of the transformed image based at least in part on applying a pretrained details boosting factor to image details of the transformed image to generate an enhanced image;
    reducing a bit depth of the enhanced image from a first bit depth to a second bit depth;
    applying a pretrained computer vision network to the enhanced image at the second bit depth to generate one or more computer vision indicators corresponding to a computer vision task for the input image, wherein the pretrained non-linear transform, details boosting factor, and computer vision network are pretrained in conjunction with one another to perform the computer vision task; and
    outputting the computer vision indicators corresponding to the input image.

12. The method of claim 11, wherein said enhancing details of the transformed image to generate the enhanced image comprises:
    applying a low-pass filter to the transformed image to generate a low pass filtered image;
    differencing the low pass filtered image from the transformed image to provide the details of the transformed image;
    multiplying the details of the transformed image by the pretrained details boosting factor to generate enhanced details of the transformed image; and summing the low pass filtered image and the enhanced details of the transformed image to generate the enhanced image.

13. The method of claim 11, wherein the pretrained non-linear transform, details boosting factor, and computer vision network are pretrained in an end-to-end manner using a training corpus.

14. The method of claim 11, wherein the pretrained non-linear transform, details boosting factor, and computer vision network are pretrained, based on a training corpus, further in conjunction with one or more additional computer vision networks to minimize a shared minimization function across the pretrained computer vision network and the one or more additional computer vision networks.

15. The method of claim 11, wherein the second bit depth is not more than one-fourth of the first bit depth.

16. The method of claim 11, wherein the input image comprises only a luma channel, and wherein the input image, the enhanced image at the first bit depth, and the enhanced image at the second bit depth all have the same spatial image resolution.

17. At least one non-transitory machine readable medium comprising a plurality of instructions that, in response to being executed on a computing device, cause the computing device to perform a computer vision task by:
applying a pretrained non-linear transform to an input image to generate a transformed image;
enhancing details of the transformed image based at least in part on applying a pretrained details boosting factor to image details of the transformed image to generate an enhanced image;
reducing a bit depth of the enhanced image from a first bit depth to a second bit depth;
applying a pretrained computer vision network to the enhanced image at the second bit depth to generate one or more computer vision indicators corresponding to a computer vision task for the input image, wherein the pretrained non-linear transform, details boosting factor, and computer vision network are pretrained in conjunction with one another to perform the computer vision task; and
outputting the computer vision indicators corresponding to the input image.

18. The non-transitory machine readable medium of claim 17, wherein said enhancing details of the transformed image to generate the enhanced image comprises:
applying a low-pass filter to the transformed image to generate a low pass filtered image;
differencing the low pass filtered image from the transformed image to provide the details of the transformed image;
multiplying the details of the transformed image by the pretrained details boosting factor to generate enhanced details of the transformed image; and
summing the low pass filtered image and the enhanced details of the transformed image to generate the enhanced image.

19. The non-transitory machine readable medium of claim 17, wherein the pretrained non-linear transform, details boosting factor, and computer vision network are pretrained in an end-to-end manner using a training corpus.

20. The non-transitory machine readable medium of claim 17, wherein the pretrained non-linear transform, details boosting factor, and computer vision network are pretrained, based on a training corpus, further in conjunction with one or more additional computer vision networks to minimize a shared minimization function across the pretrained computer vision network and the one or more additional computer vision networks.

21. The non-transitory machine readable medium of claim 17, wherein the second bit depth is not more than one-fourth of the first bit depth.

22. The non-transitory machine readable medium of claim 17, wherein the input image comprises only a luma channel, and wherein the input image, the enhanced image at the first bit depth, and the enhanced image at the second bit depth all have the same spatial image resolution.

* * * * *